US011754503B1

(12) United States Patent
Jia et al.

(10) Patent No.: US 11,754,503 B1
(45) Date of Patent: Sep. 12, 2023

(54) MEASUREMENT DEVIATION CORRECTION METHOD AND SYSTEM FOR SPARK DISCHARGE ANALYSIS OF LARGE-SIZE METAL MATERIAL

(71) Applicant: NCS TESTING TECHNOLOGY CO., LTD, Beijing (CN)

(72) Inventors: Yunhai Jia, Beijing (CN); Haizhou Wang, Beijing (CN); Liangjing Yuan, Beijing (CN); Xiaofen Zhang, Beijing (CN); Qiaochu Zhang, Beijing (CN); Lei Yu, Beijing (CN); Liang Sheng, Beijing (CN); Baibing Li, Beijing (CN)

(73) Assignee: NCS TESTING TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/975,636

(22) Filed: Oct. 28, 2022

(51) Int. Cl.
*G01N 21/67* (2006.01)
*G01N 21/93* (2006.01)

(52) U.S. Cl.
CPC ............ *G01N 21/67* (2013.01); *G01N 21/93* (2013.01)

(58) Field of Classification Search
CPC .............................. G01N 21/67; G01N 21/93
See application file for complete search history.

(56) References Cited

U.S. PATENT DOCUMENTS

| | | | |
|---|---|---|---|
| 2014/0231649 A1* | 8/2014 | Zhao .................. | G01V 8/005 250/339.01 |
| 2017/0039724 A1* | 2/2017 | Yanagiuchi ............ | G06T 7/11 |
| 2018/0156409 A1* | 6/2018 | Schwaiger ........... | F21S 41/675 |

OTHER PUBLICATIONS

Aoto Tomohiro, Dimension Measurement Device, JP 2014085269 A, May 12, 2014 (Year: 2014).*
Eberhardt et al, Method for Visual Inspection of e.g. Multi-Color Patterned Surface, in production line, Involves Applying Calibration Parameters To Corresponding Image Signals Generated From Individual Pixels of Image Sensors During Inspection, EP 2208987 A1, Jul. 21, 2010 (Year: 2010).*
Behrens et al, Lidar system, WO-2018178159-A1, Oct. 4, 2018 (Year: 2018).*

* cited by examiner

*Primary Examiner* — Sang H Nguyen
(74) *Attorney, Agent, or Firm* — Bayramoglu Law Offices LLC

(57) ABSTRACT

A measurement deviation correction method and system for spark discharge analysis of a large-size metal material includes: performing line-by-line scanning measurement on a surface of the material to obtain a line component content, performing in-line correction on the line component content by adopting a line linear fitting model, and performing inter-line correction by taking a total average value obtained by eliminating an extreme value from a line component content distribution to obtain an inter-line corrected component content; performing column-by-column scanning measurement on the surface of the material to obtain a column component content, performing in-column correction on the column component content by adopting a column linear fitting model, and performing inter-column correction by taking a total average value obtained by eliminating an extreme value from the column component content; and coupling the inter-line corrected component content and the inter-column corrected component content to obtain an optimal measurement component content.

9 Claims, 5 Drawing Sheets

X-direction scanning diameter Φ = 144 mm

Y-direction scanning diameter Φ = 144 mm

_US 11,754,503 B1_

MEASUREMENT DEVIATION CORRECTION METHOD AND SYSTEM FOR SPARK DISCHARGE ANALYSIS OF LARGE-SIZE METAL MATERIAL

TECHNICAL FIELD

The present invention relates to the technical field of material surface characterization, and in particular to a measurement deviation correction method and system for spark discharge analysis of a large-size metal material.

BACKGROUND

The comprehensive characterization of the surface components of large-size metal materials is a complex technique with great difficulty. The segregation analysis of components of meter-level large-size metal materials needs accurate scanning characterization of component surfaces. Among various means for characterizing surface components of large-size materials, due to the fact that the analysis and measurement area is large and the detection time is long, no matter a line scanning mode or a column scanning mode is adopted, the control of instrument drifts and measurement errors in the measurement process is a problem which needs to be considered. Both scanning modes may cause different degrees of error. Both scanning modes cannot guarantee to obtain the optimal scanning analysis result for detecting an area larger than 50 mm×50 mm at present.

Therefore, how to provide a measurement deviation correction method and system for spark discharge analysis of a large-size metal material, through which instrument drifts and measurement errors during the measurement process of comprehensive characterization of surface components of a large-size metal material can be effectively corrected, is a problem to be solved urgently by those skilled in the art.

SUMMARY

In view of this, the present invention provides a measurement deviation correction method and system for spark discharge analysis of a large-size metal material. The method comprises: firstly performing line-by-line scanning measurement by adopting a spark spectrum analysis method to obtain a line spark emission spectrum intensity, substituting the line spark emission spectrum intensity into a calibration equation of a spark spectrum intensity and a component content to obtain a line component content distribution; then performing in-line correction on the line component content distribution by adopting a line linear fitting equation to obtain an in-line corrected component content distribution, then eliminating an extreme value from the line component content distribution to obtain an average value, and performing inter-line correction on the in-line corrected component content distribution by taking a total average value obtained by averaging average values of all lines as a standard to obtain an inter-line corrected component content distribution; then performing column-by-column scanning measurement by adopting the spark spectrum analysis method to obtain a column spark emission spectrum intensity, and substituting the column spark emission spectrum intensity into the calibration equation of the spark spectrum intensity and the component content to obtain a column component content distribution; then performing in-column correction on the column component content distribution by adopting a column linear fitting equation to obtain an in-column corrected component content distribution, then eliminating an extreme value from the column component content distribution to obtain an average value, and performing inter-column correction on the in-column corrected component content distribution by taking a total average value obtained by averaging average values of all columns as a standard to obtain an inter-column corrected component content distribution; and finally, performing coupling by taking an average value at corresponding positions of the inter-line corrected component content distribution and the inter-column corrected component content distribution to obtain an optimal measurement component content of each position, thereby realizing effective correction on instrument drifts and measurement errors during the measurement process of comprehensive characterization of the surface components of the large-size metal material.

In order to achieve the above objective, the present invention adopts the following technical solutions:

the present invention provides a measurement deviation correction method for spark discharge analysis of a large-size metal material, which comprises:

step (1): performing line-by-line scanning measurement on a surface of the material to obtain a line component content distribution of the surface of the material, and performing in-line correction on the line component content distribution by adopting a line linear fitting model to obtain an in-line corrected component content distribution; eliminating an extreme value from the line component content distribution to obtain an average value of a line, averaging average values of all lines to obtain a total average value, and performing inter-line correction on the in-line corrected component content distribution by taking the total average value as a standard to obtain an inter-line corrected component content distribution;

step (2): performing column-by-column scanning measurement on the surface of the material to obtain a column component content distribution of the surface of the material, and performing in-column correction on the column component content distribution by adopting a column linear fitting model to obtain an in-column corrected component content distribution; eliminating an extreme value from the column component content distribution to obtain an average value of a column, averaging average values of all columns to obtain a total average value, and performing inter-column correction on the in-column corrected component content distribution by taking the total average value as a standard to obtain an inter-column corrected component content distribution; and step (3): coupling the inter-line corrected component content distribution and the inter-column corrected component content distribution at the same coordinate position to obtain an optimal measurement component content at the coordinate position.

Optionally, the line-by-line scanning measurement and the column-by-column scanning measurement are performed by adopting the spark spectrum analysis method, and a line width and a line scanning frequency of the line-by-line scanning measurement are equal to a column width and a column scanning frequency of the column-by-column scanning measurement, respectively.

Optionally, the step (1) is specifically as follows:

performing linear fitting on horizontal coordinates $X_i$ with the same vertical coordinate Y in the line component content distribution $C_{Xi}$ obtained by the line-by-line scanning measurement and all contents corresponding thereto in the line component content distribution $C_{Xi}$ to obtain a line linear fitting equation $C_{Xi}=aX_i+b$, and substituting all $X_i$ into the line linear fitting equation to obtain a fitted line component content distribution $C_{Xi}'$; obtaining a difference $\Delta C_{Xi}=C_{Xi}'-C_{Xi}$ between the fitted line component content distribution $C_{Xi}'$ and the line component content distribution $C_{Xi}$, wherein if it is known that an in-line average value of the line component content distribution $C_{Xi}$ is $\overline{C}_{Xi}$, then the in-line corrected in-line correction component content distribution is expressed as $C_{Xi}''=\overline{C}_{Xi}+\Delta C_{Xi}$; and specifically, calculating an average value by eliminating extreme values of maximum 2.5% and minimum 2.5% from the line component content distribution $C_{Xi}$ obtained by the line-by-line scanning measurement, averaging average values of all lines to obtain a total average value $\overline{C}_0$, and obtaining an in-line average value $\overline{C}_{Xi}''$ of the in-line corrected in-line correction component content distribution $C_{Xi}''$ according to the in-line corrected in-line correction component content distribution $C_{Xi}''$, wherein if $\overline{C}_{Xi}''$ is corrected to $\overline{C}_0$, then the inter-line corrected inter-line correction component content distribution is expressed as $$C_{(Xi,Y)}=C_{Xi}''+(\overline{C}_0-\overline{C}_{Xi}'').$$

Optionally, the step (2) is specifically as follows:

performing linear fitting on vertical coordinates $Y_i$ with the same horizontal coordinate X in the column component content distribution $C_{Yi}$ obtained by the column-by-column scanning measurement and all contents corresponding thereto in the column component content distribution $C_{Yi}$ to obtain a column linear fitting equation $C_{Yi}=aY_i+b$, and substituting all $Y_i$ into the column linear fitting equation to obtain a fitted column component content distribution $C_{Yi}'$; obtaining a difference $\Delta C_{Yi}=C_{Yi}'-C_{Yi}$ between the fitted column component content distribution $C_{Yi}'$ and the column component content distribution $C_{Yi}$, wherein if it is known that an in-column average value of the column component content distribution $C_{Yi}$ is $\overline{C}_{Yi}$, then the in-column corrected in-column correction component content distribution is expressed as $C_{Yi}''=\overline{C}_{Yi}+\Delta C_{Yi}$; and specifically, calculating an average value by eliminating extreme values of maximum 2.5% and minimum 2.5% from the column component content distribution $C_{Yi}$ obtained by the column-by-column scanning measurement, averaging average values of all columns to obtain a total average value $\overline{C}_0$, and obtaining an in-column average value $\overline{C}_{Yi}''$ of the in-column corrected in-column correction component content distribution $C_{Yi}''$ according to the in-column corrected in-column correction component content distribution $C_{Yi}''$, wherein if $\overline{C}_{Yi}''$ is corrected to $\overline{C}_0$, then the inter-column corrected inter-column correction component content distribution is expressed as $C_{(X,Yi)}=C_{Yi}''+(\overline{C}_0-\overline{C}_{Yi}'')$.

Optionally, in the step (3), the coupling is taking an average value at a corresponding position.

The present invention also provides a measurement deviation correction system for spark discharge analysis of a large-size metal material, which comprises:

a scanning measurement module, configured for performing line-by-line scanning measurement and column-by-column scanning measurement on a surface of the material to obtain a line spark emission spectrum intensity and a column spark emission spectrum intensity;

a data acquisition module, configured for acquiring the line spark emission spectrum intensity and the column spark emission spectrum intensity and inputting the line spark emission spectrum intensity and the column spark emission spectrum intensity into a data analysis module;

the data analysis module, configured for respectively substituting the line spark emission spectrum intensity and the column spark emission spectrum intensity into a calibration equation of a spark spectrum intensity and a component content to obtain a line component content distribution and a column component content distribution and calculating an optimal measurement component content according to the line component content distribution and the column component content distribution; and a control module, configured for controlling the scanning measurement module to perform line-by-line scanning measurement and column-by-column scanning measurement on the surface of the material.

Optionally, the scanning measurement module is a multi-channel spark excitation source.

Optionally, the data acquisition module is a photomultiplier tube or a CCD detector or a CMOS detector.

Optionally, the spark spectrum analysis module is a terminal.

Optionally, the control module is a highly-accurate numerically-controlled X/Y directional translation stage.

According to the above technical solutions, compared with the prior art, the present invention provides a measurement deviation correction method and system for spark discharge analysis of a large-size metal material. The method comprises: firstly performing line-by-line scanning measurement by adopting a spark spectrum analysis method to obtain a line spark emission spectrum intensity, substituting the line spark emission spectrum intensity into a calibration equation of a spark spectrum intensity and a component content to obtain a line component content distribution; then performing in-line correction on the line component content distribution by adopting a line linear fitting equation to obtain an in-line corrected component content distribution, then eliminating an extreme value from the line component content distribution to obtain an average value, and performing inter-line correction on the in-line corrected component content distribution by taking a total average value obtained by averaging average values of all lines as a standard to obtain an inter-line corrected component content distribution; then performing column-by-column scanning measurement by adopting the spark spectrum analysis method to obtain a column spark emission spectrum intensity, and substituting the column spark emission spectrum intensity into the calibration equation of the spark spectrum intensity and the component content to obtain a column component content distribution; then performing in-column correction on the column component content distribution by adopting a column linear fitting equation to obtain an in-column corrected component content distribution, then eliminating an extreme value from the column component content distribution to obtain an average value, and performing inter-column correction on the in-column corrected component content distribution by taking a total average value obtained by averaging average values of all columns as a standard to obtain an inter-column corrected component content distribution; and finally, performing coupling by taking an average value at corresponding positions of the inter-line corrected component content distribution and the inter-column corrected component content distribution to obtain an optimal measurement component content of each position, thereby realizing effective correction on instrument drifts and measurement errors during the measurement process of comprehensive characterization of the surface components of the large-size metal material.

BRIEF DESCRIPTION OF THE DRAWINGS

In order to more clearly illustrate the technical solutions in the examples of the present invention or in the prior art, the drawings required to be used in the description of the examples or the prior art are briefly introduced below. It is obvious that the drawings in the description below are merely examples of the present invention, and those of ordinary skilled in the art can obtain other drawings according to the drawings provided without creative efforts.

DETAILED DESCRIPTION OF THE EMBODIMENTS

The technical solutions in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skilled in the art without creative efforts fall within the protection scope of the present invention.

Figure 1:
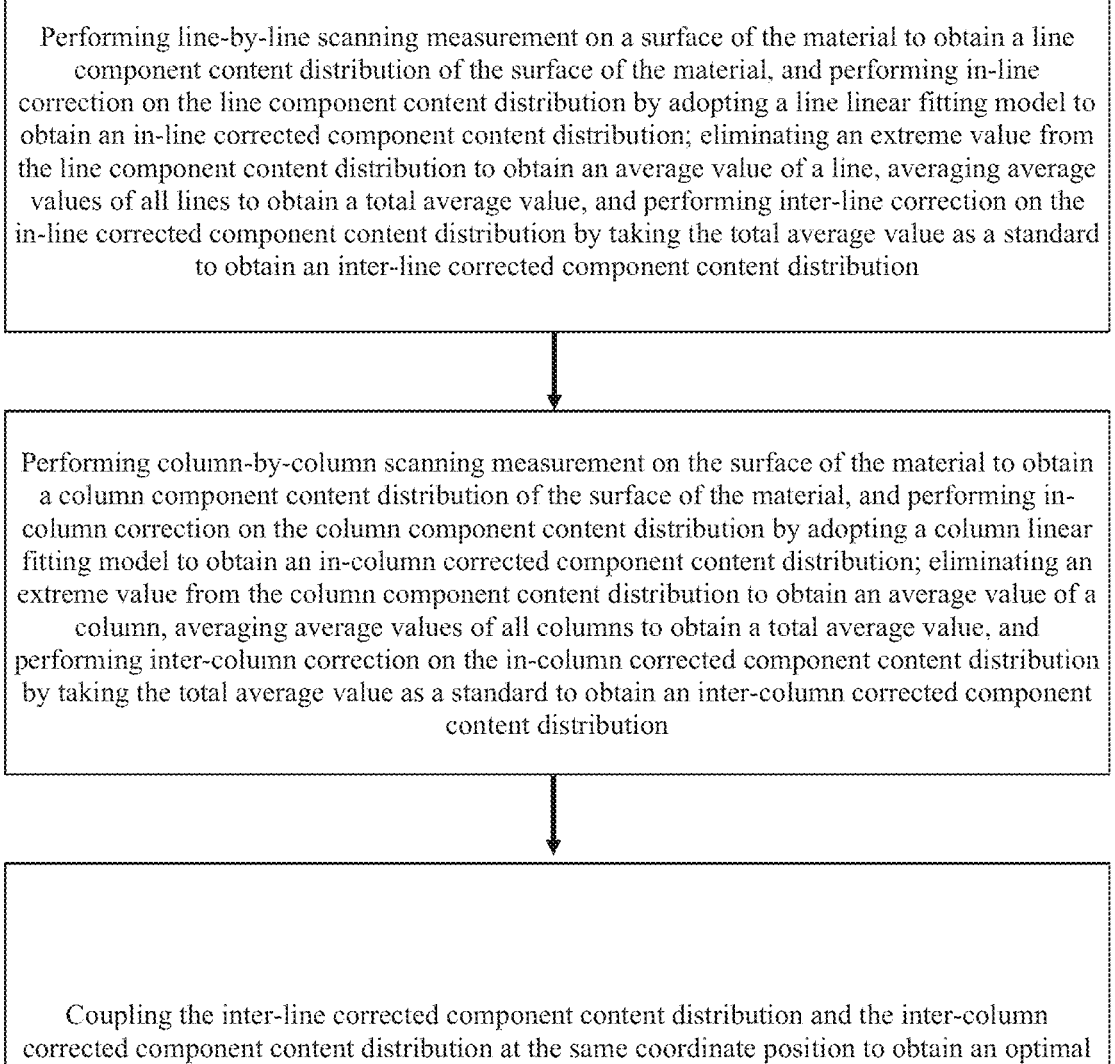
FIG. 1 is a schematic flow chart according to the present invention.
Figure 2:
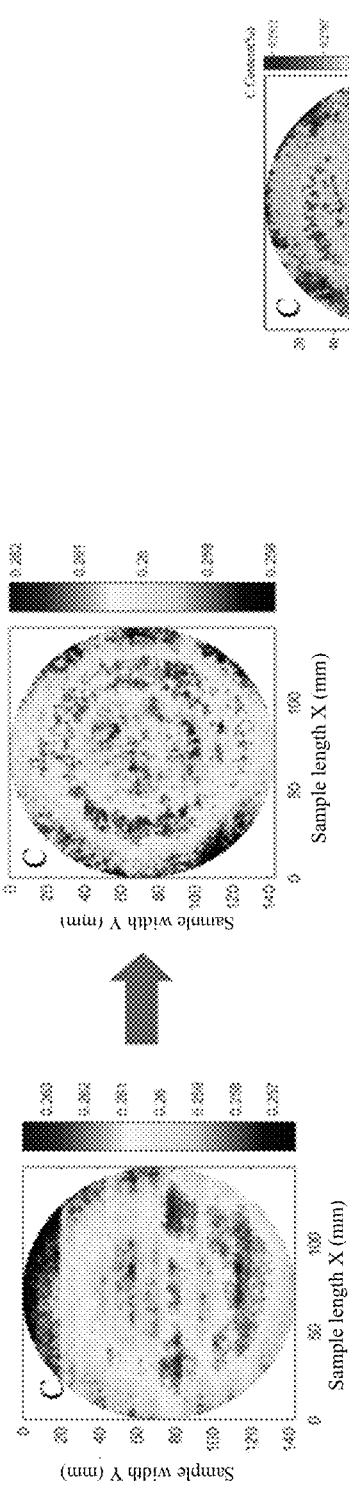
FIG. 2 is a schematic flow chart of the structure according to the present invention.
Figure 2:
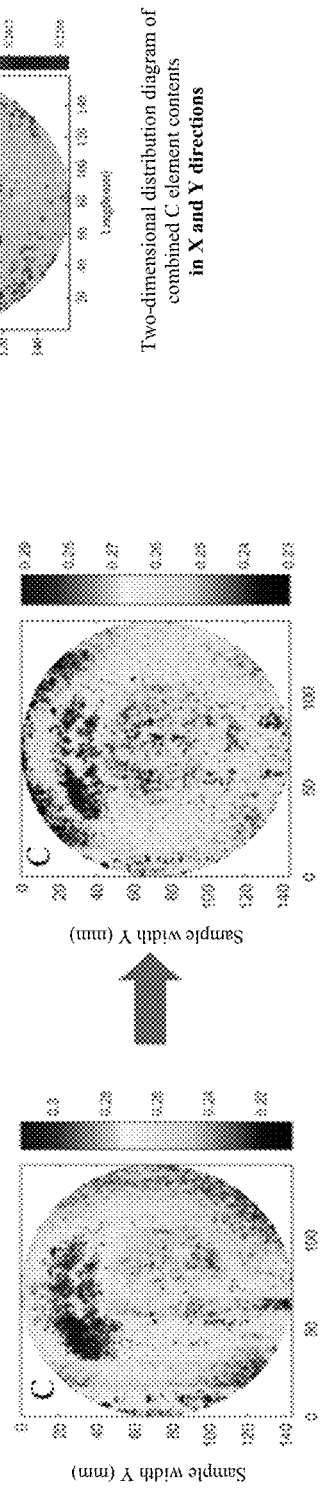
Figure 3:
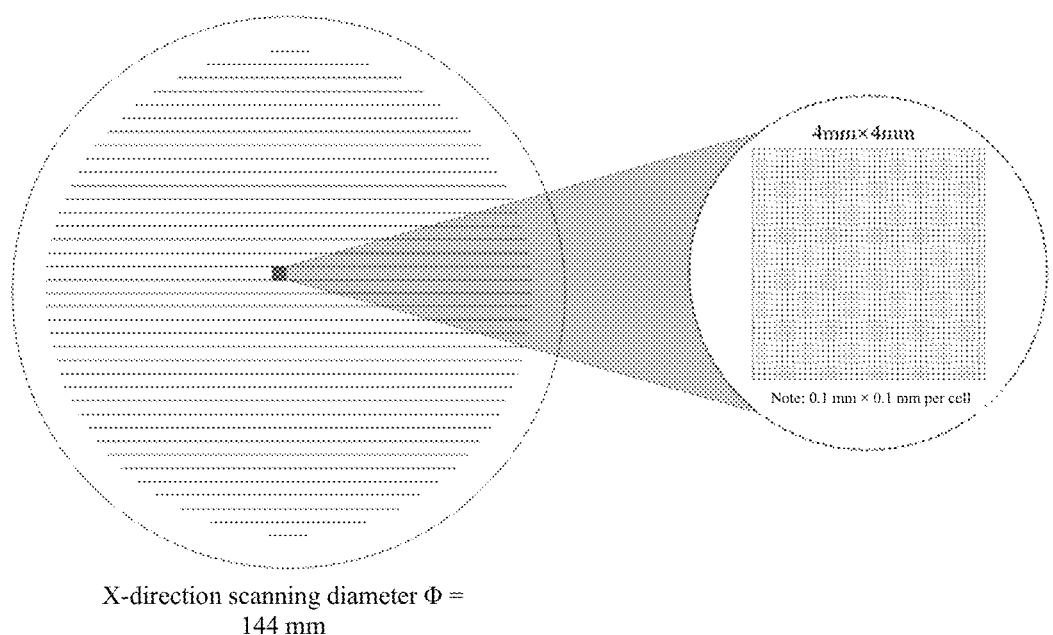
FIG. 3 is a schematic diagram of a spark spectrum component analysis through line scanning according to the present invention.
Figure 4:
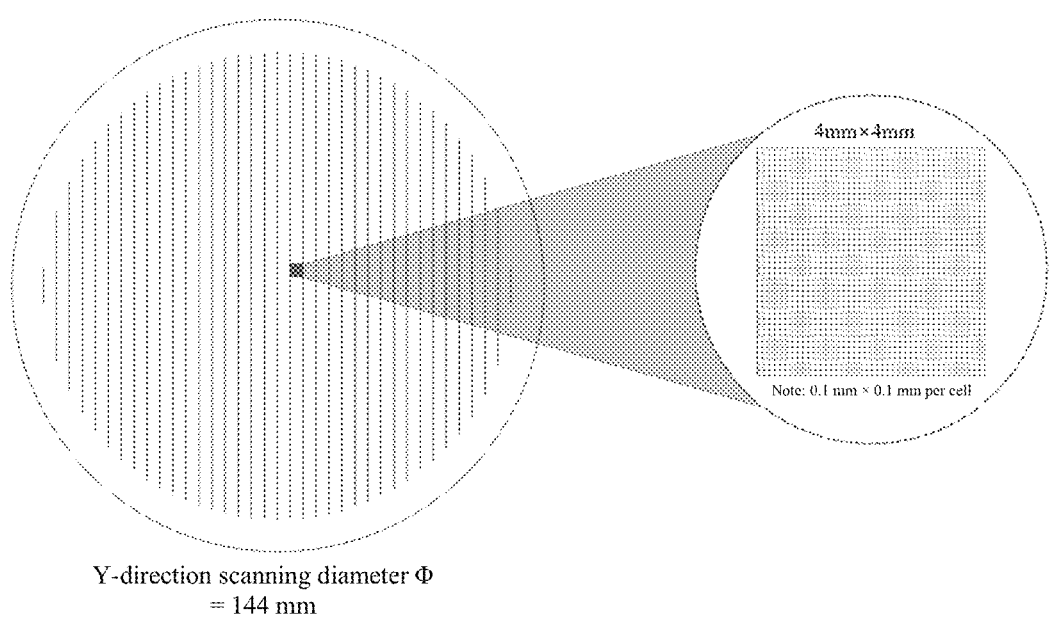
FIG. 4 is a schematic diagram of a spark spectrum component analysis through column scanning according to the present invention.
Figure 5:
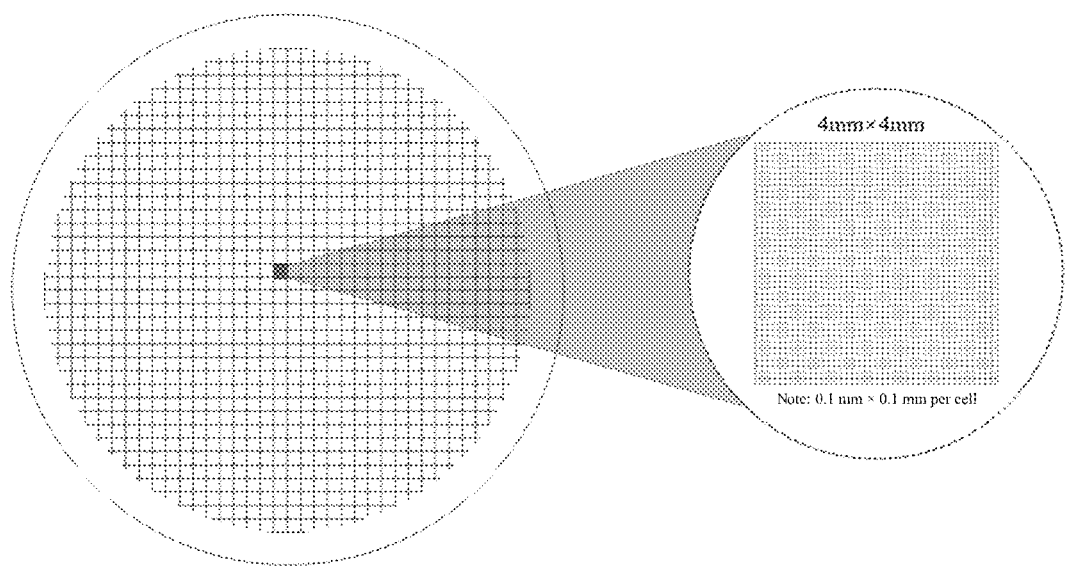
FIG. 5 is a schematic diagram of synthetic grids of a spark spectrum component analysis through line-column double scanning according to the present invention.
Figure 6:
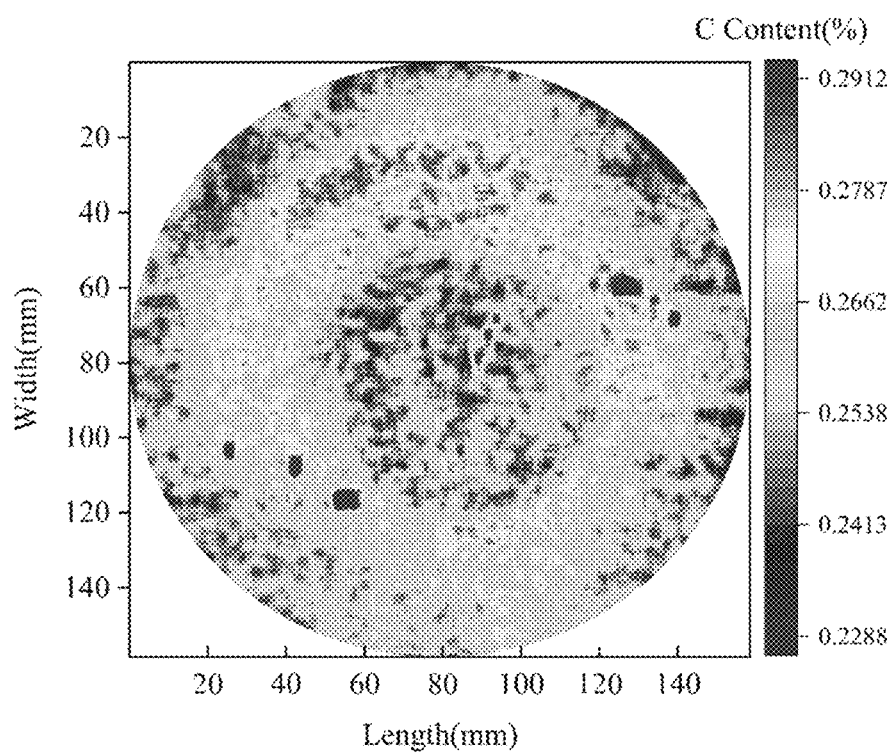
FIG. 6 is a schematic diagram of a final correction and coupling result according to the present invention.

Embodiment 1 of the present invention discloses a measurement deviation correction method for spark discharge analysis of a large-size metal material, as shown in FIG. 1, which comprises:

step (1): performing line-by-line scanning measurement on a surface of the material by adopting a spark spectrum analysis method, with the line width being set to be 4 mm and the line scanning frequency being set to be 1 mm/s (then the component content at a position of each 0.1 mm is obtained), to obtain a line component content distribution of the surface of the material; performing in-line correction on the line component content distribution by adopting a line linear fitting model to obtain an in-line corrected component content distribution; eliminating an extreme value from the line component content distribution to obtain an average value of a line, averaging average values of all lines to obtain a total average value, and performing inter-line correction on the in-line corrected component content distribution by taking the total average value as a standard to obtain an inter-line corrected component content distribution, wherein the step is specifically as follows:

performing linear fitting on horizontal coordinates $X_i$ with the same vertical coordinate Y in the line component content distribution $C_{Xi}$ obtained by the line-by-line scanning measurement and all contents corresponding thereto in the line component content distribution $C_{Xi}$ to obtain a line linear fitting equation $C_{Xi}=aX_i+b$, and substituting all $X_i$ into the line linear fitting equation to obtain a fitted line component content distribution $C_{Xi}'$; obtaining a difference $\Delta C_{Xi}=C_{Xi}'-C_{Xi}$ between the fitted line component content distribution $C_{Xi}'$ and the line component content distribution $C_{Xi}$, wherein if it is known that an in-line average value of the line component content distribution $C_{Xi}$ is $\overline{C}_{Xi}$, then the in-line corrected in-line correction component content distribution is expressed as $C_{Xi}''=\overline{C}_{Xi}+\Delta C_{Xi}$, and specifically, calculating an average value by eliminating extreme values of maximum 2.5% and minimum 2.5% from the line component content distribution $C_{Xi}$ obtained by the line-by-line scanning measurement, averaging average values of all lines to obtain a total average value $\overline{C}_0$, and obtaining an in-line average value $\overline{C}_{Xi}''$ of the in-line corrected in-line correction component content distribution $C_{Xi}''$ according to the in-line corrected in-line correction component content distribution $C_{Xi}''$, wherein if $\overline{C}_{Xi}''$ is corrected to $\overline{C}_0$, then the inter-line corrected inter-line correction component content distribution is expressed as $C_{(Xi, Y)}=C_{Xi}''+(\overline{C}_0-\overline{C}_{Xi}'')$.

step (2): performing column-by-column scanning measurement on the surface of the material by adopting the spark spectrum analysis method, with the column width being set to be 4 mm and the column scanning frequency being set to be 1 mm/s (then the component content at a position of each 0.1 mm is obtained), to obtain a column component content distribution of the surface of the material; performing in-column correction on the column component content distribution by adopting a column linear fitting model to obtain an in-column corrected component content distribution; eliminating an extreme value from the column component content distribution to obtain an average value of a column, averaging average values of all columns to obtain a total average value, and performing inter-column correction on the in-column corrected component content distribution by taking the total average value as a standard to obtain an inter-column corrected component content distribution, wherein the step is specifically as follows:

performing linear fitting on vertical coordinates $Y_i$ with the same horizontal coordinate X in the column component content distribution $C_{Yi}$ obtained by the column-by-column scanning measurement and all contents corresponding thereto in the column component content distribution $C_{Yi}$ to obtain a column linear fitting equation $C_{Yi}=aY_i+b$, and substituting all $Y_i$ into the column linear fitting equation to obtain a fitted column component content distribution $C_{Yi}'$; obtaining a difference $\Delta C_{Yi}=C_{Yi}'-C_{Yi}$ between the fitted column component content distribution $C_{Yi}'$ and the column component content distribution $C_{Yi}$, wherein if it is known that an in-column average value of the column component content distribution $C_{Yi}$ is $\overline{C}_{Yi}$, then the in-column corrected in-column correction component content distribution is expressed as $C_{Yi}''=\overline{C}_{Yi}+\Delta C_{Yi}$; and specifically, calculating an average value by eliminating extreme values of maximum 2.5% and minimum 2.5% from the column component content distribution $C_{Yi}$ obtained by the column-by-column scanning measurement, averaging average values of all columns to obtain a total average value $\overline{C}_0$, and obtaining an in-column average value $\overline{C}_{Yi}''$ of the in-column corrected in-column correction component content distribution $C_{Yi}''$ according to the in-column corrected in-column correction component content distribution $C_{Yi}''$, wherein if $\overline{C}_{Yi}''$ is corrected to $\overline{C}_0$, then the inter-column corrected inter-column correction component content distribution is expressed as $C_{(X, Yi)}=C_{Yi}''=(\overline{C}_0-\overline{C}_{Yi}'')$.

step (3): taking an average value at corresponding positions of the inter-line corrected component content distribution and the inter-column corrected component content distribution at the same coordinate position to obtain an optimal measurement component content at the coordinate position, wherein as position errors and measurement errors exist even in accurate scanning, two content values at positions of an area of each 0.01 mm² in the inter-line corrected component content distribution and the inter-column corrected component content distribution are averaged to obtain an optimal measurement component content at the position, and the content synthesis formula is expressed as follows:

$$C(X,Y)=[C(Xi,Y)+C(X,Yi)]/2$$

Figure 7:
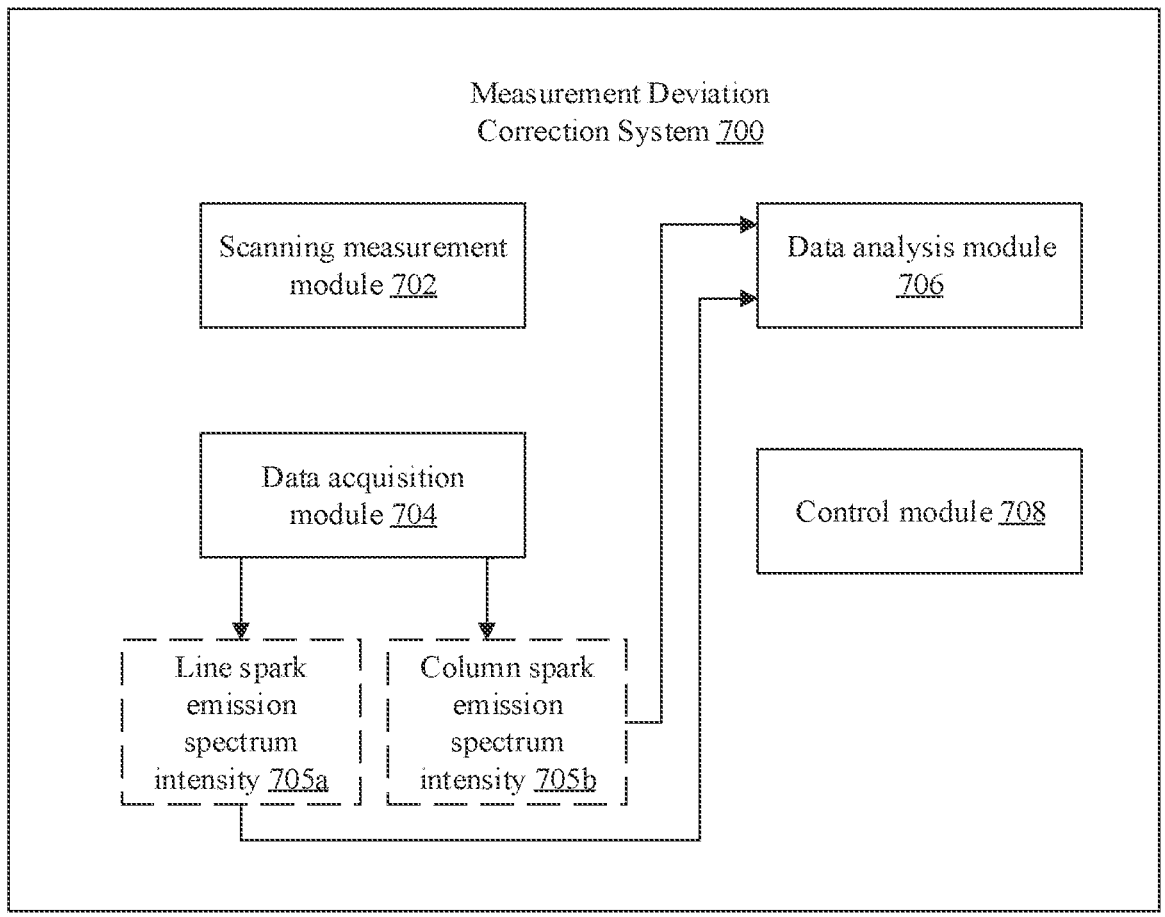
FIG. 7 is a block diagram of a measurement deviation correction system according to the present invention.

With reference to FIG. 7, Embodiment 2 of the present invention also provides a measurement deviation correction system 700 for spark discharge analysis of a large-size metal material, which comprises:

a scanning measurement module 702, configured for performing line-by-line scanning measurement and column-by-column scanning measurement on a surface of the material by adopting a multi-channel spark excitation source to obtain a line spark emission spectrum intensity and a column spark emission spectrum intensity; a data acquisition module 704, configured for acquiring the line spark emission spectrum intensity 705a and the column spark emission spectrum intensity 705b by adopting a photomultiplier tube or a CCD detector or a CMOS detector and inputting the line spark emission spectrum intensity and the column spark emission spectrum intensity into a data analysis module 706; the data analysis module, as a terminal, configured for respectively substituting the line spark emission spectrum intensity and the column spark emission spectrum intensity into a calibration equation of a spark spectrum intensity and a component content to obtain a line component content distribution and a column component content distribution and calculating an optimal measurement component content according to the line component content distribution and the column component content distribution; and a control module 708, configured for controlling the scanning measurement module to perform line-by-line scanning measurement and column-by-column scanning measurement on the surface of the material by adopting a highly-accurate numerically-controlled X/Y directional translation stage.

The embodiments of the present invention discloses a measurement deviation correction method and system for spark discharge analysis of a large-size metal material. The method comprises: firstly performing line-by-line scanning measurement by adopting a spark spectrum analysis method to obtain a line spark emission spectrum intensity, substituting the line spark emission spectrum intensity into a calibration equation of a spark spectrum intensity and a component content to obtain a line component content distribution; then performing in-line correction on the line component content distribution by adopting a line linear fitting equation to obtain an in-line corrected component content distribution, then eliminating an extreme value from the line component content distribution to obtain an average value, and performing inter-line correction on the in-line corrected component content distribution by taking a total average value obtained by averaging average values of all lines as a standard to obtain an inter-line corrected component content distribution; then performing column-by-column scanning measurement by adopting the spark spectrum analysis method to obtain a column spark emission spectrum intensity, and substituting the column spark emission spectrum intensity into the calibration equation of the spark spectrum intensity and the component content to obtain a column component content distribution; then performing in-column correction on the column component content distribution by adopting a column linear fitting equation to obtain an in-column corrected component content distribution, then eliminating an extreme value from the column component content distribution to obtain an average value, and performing inter-column correction on the in-column corrected component content distribution by taking a total average value obtained by averaging average values of all columns as a standard to obtain an inter-column corrected component content distribution; and finally, performing coupling by taking an average value at corresponding positions of the inter-line corrected component content distribution and the inter-column corrected component content distribution to obtain an optimal measurement component content of each position, thereby realizing effective correction on instrument drifts and measurement errors during the measurement process of comprehensive characterization of the surface components of the large-size metal material.

The embodiments in the specification are all described in a progressive manner, and each embodiment focuses on differences from other embodiments, and portions that are the same and similar between the embodiments may be referred to each other. Since the device disclosed in the embodiment corresponds to the method disclosed in the embodiment, the description is relatively simple, and reference may be made to the partial description of the method.

The above description of the disclosed embodiments enables those skilled in the art to implement or use the present invention. Various modifications to these embodiments will be readily apparent to those skilled in the art, and the generic principles defined herein may be applied to other embodiments without departing from the spirit or scope of the present invention. Thus, the present invention is not intended to be limited to these embodiments shown herein but is to accord with the broadest scope consistent with the principles and novel features disclosed herein.

The invention claimed is:

1. A measurement deviation correction method for a spark discharge analysis of a large-size metal material, comprising:

step (1): performing a line-by-line scanning measurement on a surface of the large-size metal material to obtain a line component content distribution of the surface of the large-size metal material, and performing an in-line correction on the line component content distribution by adopting a line linear fitting model to obtain an in-line corrected component content distribution by performing a linear fitting on horizontal coordinates $X_i$ with a same vertical coordinate Y in the line component content distribution $C_{Xi}$ obtained by the line-by-line scanning measurement and all contents corresponding to the horizontal coordinates $X_i$ in the line component content distribution $C_{Xi}$ to obtain a line linear fitting equation $C_{Xi}=aX_i+b$, and substituting all $X_i$ into the line linear fitting equation to obtain a fitted line component content distribution $C_{Xi}'$, and obtaining a difference $\Delta C_{Xi}=C_{Xi}'-C_{Xi}$ between the fitted line component content distribution $C_{Xi}'$ and the line component content distribution $C_{Xi}$, wherein an in-line average value of the line component content distribution $C_{Xi}$ is $\overline{C}_{Xi}$, and the in-line corrected component content distribution is expressed as $C_{Xi}''=\overline{C}_{Xi}+\Delta C_{Xi}$; eliminating an extreme value from the line component content distribution to obtain an average value of a line, averaging average values of all lines to obtain a first total average value, and performing an inter-line correction on the in-line corrected component content distribution by taking the first total average value as a first standard to obtain an inter-line corrected component content distribution;

step (2): performing a column-by-column scanning measurement on the surface of the large-size metal material to obtain a column component content distribution of the surface of the large-size metal material, and performing an in-column correction on the column component content distribution by adopting a column linear fitting model to obtain an in-column corrected component content distribution; eliminating an extreme value from the column component content distribution to obtain an average value of a column, averaging average values of all columns to obtain a second total average value, and performing an inter-column correction on the in-column corrected component content distribution by taking the second total average value as a second standard to obtain an inter-column corrected component content distribution; and step (3): coupling the inter-line corrected component content distribution and the inter-column corrected component content distribution at a same coordinate position to obtain an optimal measurement component content at the coordinate position.

2. The measurement deviation correction method for the spark discharge analysis of the large-size metal material according to claim 1, wherein the line-by-line scanning measurement and the column-by-column scanning measurement are performed by adopting a spark spectrum analysis method, and a line width and a line scanning frequency of the line-by-line scanning measurement are equal to a column width and a column scanning frequency of the column-by-column scanning measurement, respectively.

3. The measurement deviation correction method for the spark discharge analysis of the large-size metal material according to claim 1, wherein the step (1) further comprises:

calculating an average value by eliminating extreme values of maximum 2.5% and minimum 2.5% from the line component content distribution $C_{Xi}$ obtained by the line-by-line scanning measurement, averaging the average values of all lines to obtain the first total average value $\overline{C}_0$, and obtaining an in-line average value $\overline{C}_{Xi}''$ of the in-line corrected in line correction component content distribution $C_{Xi}''$ wherein $\overline{C}_{Xi}''$ is corrected to $\overline{C}_0$ and the inter-line corrected component content distribution is expressed as $C_{(Xi,\ Y_i)}=C_{Xi}''+(\overline{C}_0-\overline{C}_{Xi}'')$.

4. The measurement deviation correction method for the spark discharge analysis of the large-size metal material according to claim 1, wherein the step (2) further comprises:

performing linear fitting on vertical coordinates $Y_i$ with a same horizontal coordinate X in the column component content distribution $C_{Yi}$ obtained by the column-by-column scanning measurement and all contents corresponding to the vertical coordinates $Y_i$ in the column component content distribution $C_{Yi}$ to obtain a column linear fitting equation $C_{Yi}=aY_i+b$, and substituting all $Y_i$ into the column linear fitting equation to obtain a fitted column component content distribution $C_{Yi}'$; obtaining a difference $\Delta C_{Yi}=C_{Yi}'-C_{Yi}$ between the fitted column component content distribution $C_{Yi}'$, and the column component content distribution $C_{Yi}$, wherein an in-column average value of the column component content distribution $C_{Yi}$ is $\overline{C}_{Yi}$, and the in-column corrected component content distribution is expressed as $C_{Yi}''=\overline{C}_{Yi}+\Delta C_{Yi}$; and specifically, calculating an average value by eliminating extreme values of maximum 2.5% and minimum 2.5% from the column component content distribution $C_{Yi}$ obtained by the column-by-column scanning measurement, averaging the average values of all columns to obtain the second total average value $\overline{C}_0$, and obtaining an in-column average value $\overline{C}_{Yi}''$ of the in-column corrected component content distribution $C_{Yi}''$, wherein $\overline{C}_{Yi}''$ is corrected to $\overline{C}_0$, and the inter-column corrected component content distribution is expressed as $C_{(X,\ Yi)}=C_{Yi}''+(\overline{C}_0-\overline{C}_{Yi}'')$.

5. The measurement deviation correction method for the spark discharge analysis of the large-size metal material according to claim 1, wherein in the step (3), the coupling is taking an average value at a corresponding position.

6. A measurement deviation correction system for a spark discharge analysis of a large-size metal material, comprising:

a scanning measurement module implemented by a photon source, configured for performing a line-by-line scanning measurement and a column-by-column scanning measurement on a surface of the large-size metal material to obtain a line spark emission spectrum intensity and a column spark emission spectrum intensity;

a data acquisition module implemented by a photodetector, configured for acquiring the line spark emission spectrum intensity and the column spark emission spectrum intensity and inputting the line spark emission spectrum intensity and the column spark emission spectrum intensity into a data analysis module;

the data analysis module implemented by a computer, configured for respectively substituting the line spark emission spectrum intensity and the column spark emission spectrum intensity into a calibration equation of a spark spectrum intensity and a component content to obtain a line component content distribution and a column component content distribution and calculating an optimal measurement component content according to the line component content distribution and the column component content distribution by performing linear fitting on vertical coordinates $Y_i$ with a same horizontal coordinate X in the column component content distribution $C_{Yi}$ obtained by the column-by-column scanning measurement and all contents corresponding to the vertical coordinates $Y_i$ in the column component content distribution $C_{Yi}$ to obtain a column linear fitting equation $C_{Yi}=aY_i+b$, and substituting all $Y_i$ into the column linear fitting equation to obtain a fitted column component content distribution $C_{Yi}'$, and obtaining a difference $\Delta C_{Yi}=C_{Yi}'-C_{Yi}$ between the fitted column component content distribution $C_{Yi}'$, and the column component content distribution $C_{Yi}$, wherein an in-column average value of the column component content distribution $C_{Yi}$ is $\overline{C}_{Yi}$, and an in-column corrected content distribution is expressed as $C_{Yi}''=\overline{C}_{Yi}+\Delta C_{Yi}$ and utilized to determine the optimal measurement component content; and a control module implemented by a computer controller, configured for controlling the scanning measurement module to perform the line-by-line scanning measurement and the column-by-column scanning measurement on the surface of the large-size metal material.

7. The measurement deviation correction system for the spark discharge analysis of the large-size metal material according to claim 6, wherein the scanning measurement module is a multi-channel spark excitation source.

8. The measurement deviation correction system for the spark discharge analysis of the large-size metal material according to claim 6, wherein the data acquisition module is a photomultiplier tube or a CCD detector or a CMOS detector.

9. The measurement deviation correction system for the spark discharge analysis of the large-size metal material according to claim 6, wherein the control module is a numerically-controlled X/Y directional translation stage.

\* \* \* \* \*